(12) United States Patent
Duan

(10) Patent No.: US 6,706,842 B1
(45) Date of Patent: Mar. 16, 2004

(54) CROSSLINKED POLYESTER COPOLYMERS

(76) Inventor: Jiwen F. Duan, 207 Gingergate Dr., Cary, NC (US) 27519

( * ) Notice: Subject to any disclaimer, the term of this patent is extended or adjusted under 35 U.S.C. 154(b) by 0 days.

(21) Appl. No.: 10/360,198

(22) Filed: Feb. 6, 2003

(51) Int. Cl.[7] .................................................. C08G 77/04
(52) U.S. Cl. ............................ 528/26; 528/27; 528/38; 528/272; 528/288; 528/297; 528/300; 528/302; 528/306; 528/308; 528/308.6; 524/188; 524/196
(58) Field of Search .............................. 528/26, 27, 38, 528/272, 288, 297, 300, 302, 306, 308, 308.6; 524/188, 196

(56) References Cited

U.S. PATENT DOCUMENTS

| | | |
|---|---|---|
| 3,335,211 A | 8/1967 | Mead et al. |
| 3,406,152 A | 10/1968 | Koller |
| 3,673,139 A | 6/1972 | Hrach |
| 3,692,744 A | 9/1972 | Rich et al. |
| 4,223,125 A | 9/1980 | Bier et al. |
| 4,234,708 A | 11/1980 | Edelman et al. |
| 4,833,032 A | 5/1989 | Reese |
| 5,235,027 A | 8/1993 | Thiele et al. |
| 5,300,626 A | 4/1994 | Jehl et al. |
| 5,302,686 A | 4/1994 | Tanaka et al. |
| 5,478,909 A | 12/1995 | Jehl et al. |
| 5,661,193 A | 8/1997 | Khemani |
| 6,221,944 B1 | 4/2001 | Liebeskind et al. |
| 6,407,194 B1 | 6/2002 | Duan |
| 6,451,755 B1 | 9/2002 | Norman |
| 6,469,120 B1 | 10/2002 | Elfersy et al. |
| 6,479,619 B1 | 11/2002 | Duan |
| 6,506,853 B2 | 1/2003 | Duan |

FOREIGN PATENT DOCUMENTS

| | | |
|---|---|---|
| AU | 9961818 | 9/1999 |
| EP | 294912 A2 | 12/1988 |
| EP | 0543298 A1 | 5/1993 |
| EP | 0545108 A1 | 6/1993 |
| GB | 1569296 A | 6/1980 |

*Primary Examiner*—Samuel A. Acquah

(57) ABSTRACT

A glycol-organosilane composition and a process for producing the composition are disclosed. The composition comprises or is produced by combining (a) a glycol and (b) an organosilane. This composition is preferably substantially soluble in glycol and water. Also disclosed is a polyester composition and a process to produce the composition. The composition comprises repeat units derived from (a) a carbonyl compound or its oligomer, (b) a glycol, (c) a crosslinker, and (d) optionally a comonomer. The crosslinker can be the glycol-organosilane, a carbonyl compound containing 3 or more carboxyl groups, or an alcohol containing 3 or more hydroxyl groups. The comonomer is a dicarboxylic compound, a diol compound, or a carbonyl alcohol. The polyester composition can be used to increase the rate of polymerization, to increase pilling resistance and strength of polyester, to decrease crystallization rate and improve object forming process such as fibers and containers.

37 Claims, No Drawings

CROSSLINKED POLYESTER COPOLYMERS

FIELD OF THE INVENTION

This invention relates to a crosslinked polyester copolymer, to a composition that can be used to produce the copolymer, to a process for producing the composition and the crosslinked copolyester.

BACKGROUND OF THE INVENTION

Polyesters are widely used to manufacture textile fibers, containers, and packaging materials. Polyesters can be manufactured by combining a glycol, such as ethylene glycol, and a carbonyl compound, such as dimethyl terephthalate (DMT) or terephthalic acid (TPA). In the DMT route, DMT reacts with the glycol to form a bis-glycolate ester of terephthalate ("monomer") in an ester exchanger column. The monomer is then polymerized by condensation reactions in one or two prepolymerizers and then a final polymerizer or finisher.

In the TPA route, TPA is combined with the glycol to form a slurry at 60° C. to 100° C. followed by injecting the slurry into an esterifier. A linear oligomer with a degree of polymerization 5 to 10 is formed in one or two esterifiers at temperatures from 240° C. to 290° C. The oligomer is polymerized in one or two prepolymerizers and then in a final polymerizer at temperatures from 250° C. to 300° C. Water is a byproduct of the TPA esterification and polycondensation process.

A problem associated with polyester fibers is their tendency to pill. Pilling is a defect in fabric caused when fibers are rubbed or pulled out of yarns and entangled with intact fibers, forming soft, fizzy balls on the fabric surface. One of the most common commercial practices to produce pilling resistant fibers is to make lower molecular weight polyester. Unfortunately, spinning is very difficult or impossible with lower molecular weight polyester fibers. A temporary crosslinker or brancher can be used to increase molecular weight and polymer strength for better spinning performance. After spinning, the temporary crosslinks or branches hydrolyze in water. Tetraethoxysilane (TEOS) has been used commercially in DMT process to produce pilling resistance fibers. TPA process, however, has byproduct water, TEOS forms rocks or sands in the recycle glycol of TPA process.

The dilemma is that the temporary crosslinker or brancher must hydrolyze after spinning, but it must not hydrolyze in TPA polymerization process where there is water. U.S. Pat. No. 6,407,194 discloses a temporary crosslinker 3-Glycidoxypropyltrimethoxysilane (GTMS) to improve the pilling resistant of polyester fibers, which does not form solids in the TPA process. The spinning performance of polyester containing GTMS, however, is not as good as the polyester containing TEOS, because GTMS forms permanent crosslinks or branches due to the hydrophilic epoxy group in addition to the temporary crosslinks or branches, resulting in excessive crosslinks or branches in the polyester. According to the invention, GTMS is merely dissolved in the glycol solution before injection, most methanol byproduct from GTMS emits in the TPA polymerization process.

Most new polyester plants built in the world are based on the newer TPA process. Therefore, there is an increasing need to develop a polyester polymer having lower molecular weight that is crosslinked with a temporary crosslinker to increase molecular weight for spinning, which does not form solids in TPA process.

An additional consideration for producing polyester polymers is the rate of crystallization of partially oriented yarn (POY) during spinning. Normal spinning speeds are typically in the order of 3000–3500 m/min for POY. At higher spinning spuds, such as 4000–5000 m/min, crystallization of the POY can occur too fast, resulting in low orientation in fibers and deteriorates physical properties such as tenacity, elongation, and shrinkage. Further, the draw texturing speed of POY is normally about 900 m/min. Higher draw texturing speed such as 1000 m/min requires POY with lower crystallization.

Also, for container and packaging materials, polyethylene terephthalate (PET) are often modified with a comonomer such as isophthalic acid (IPA) and diethylene glycol (DEG) to reduce the crystallization rate during injection or extrusion blow molding. However, the resulting products have lower strength due to these additives.

Normal PET fibers require disperse dye at temperature 120 to 140 degree C. under high pressure. PET copolymer containing additives such as polyethylene glycol can be dyed at temperature 100 degree C. or lower under atmospheric pressure, but its melt strength is low and spinning is more difficult. PET copolymer containing IPA 15% to 40% by mole has been commercially produced for binder fibers, this copolymer can be difficult to spin because the melt strength is low.

Accordingly, there is a desire to decrease the crystallization rate of the polyester polymer during spinning without adversely altering the physical properties of the polyester polymer fiber, to develop a polyester composition and process suitable for injection and extrusion blow molding for container and packaging materials, which has low rate of crystallization, good heat resistance, high strength and clarity; and to develop a polyester copolymer with higher melt strength for fiber products such as binder fibers, biodegradable fibers, atmospherically dyeable fibers.

SUMMARY OF THE INVENTION

The present invention comprises a glycol-organosilane composition that comprises or is produced by combining (a) a glycol and (b) an organosilane comprising $D_m SiX_n Z_p$, where D is a halogen, a hydrogen, or a hydrocarbon oxygen group; X is a hydrocarbon or a hydrocarbon oxygen group; Z is a reactive hydrophobic group or a hydrophilic group; m and n are each about 1 to about 3; and p is 1 to 20. This composition is preferably substantially soluble in glycol and water.

The invention also comprises a polyester copolymer composition and a process to produce the composition. The composition comprises repeat units derived from (a) a carbonyl compound or its oligomer, (b) a glycol, (c) a crosslinker, and (d) optionally a comonomer. A preferred process for producing the polyester copolymer comprises contacting a crosslinker, and optionally a comonomer, with a polymerization mixture comprising or consisting essentially of a glycol and either a carbonyl compound or its oligomer. The process can be used for increasing the rate of polymerization, for increasing the pill resistance or strength of a polyester copolymer, or for decreasing the crystallization rate during object forming process such as spinning of fibers or injection and extrusion blow molding and stretching of containers and packaging materials.

DETAILED DESCRIPTION OF THE INVENTION

The terms "crosslinked polyester polymer" and "crosslinked polyester copolymer" are alternatively used herein referring polyester polymer containing temporary or permanent crosslinker or brancher, with or without a comonomer.

The term "temporary crosslinker" herein refers to a composition that temporary crosslinks or branches polyester molecules, and thereby increases the molecular weight of the polyester polymer and melt viscosity. The bonds of the branches or crosslinks (Si—O) formed by the crosslinker can be broken down after spinning by hydrolysis in water, moisture, an alcohol, a weak acid, or a weak base.

The term "permanent crosslinker" herein refers to a composition that permanently crosslinks or branches polyester molecules. The bonds of the crosslinks and branches do not break down in water, an alcohol, a weak acid, or a weak base.

The term "glycol-organosilane composition" and "glycol-organosilane" as used herein refers to a product produced from a glycol and an organosilane, preferably it is a reaction product produced by partially reacting an organosilane with a glycol. By partially reacting or reacted, it is meant that about 20% to about 99%, preferably 50% to 95%, even more preferably 60% to 90%, by mole, of all reactive functional groups in the organosilane molecule that can react with a glycol are reacted with the glycol. The term "reactive functional groups" refers to those functional groups that can react with a glycol. The term "reactive functional groups" herein can also refer to those functional groups that can react with an alcohol, a carbonyl compound, an acid or base as disclosed below.

Wishing not to be bound by theory, it is believed that, if the extent of reaction is too low (i.e, less than 20 mole %), the glycol-organosilane composition cannot be dissolved in water unless the Z is a hydrophilic group and that, if the extent of reaction is too high (i.e., more then 99%), there can be some undesirable side reactions. The extent of the reaction can be determined by any suitable means known to one skilled in the art, such as by chemical analysis of functional groups or by weighing the byproduct separated by a suitable means such as distillation or filtration.

The glycol-organosilane composition can comprise (a) a glycol and (b) an organosilane $D_mSiX_nZ_p$ as disclosed in the SUMMARY. Preferably, D is independently a halogen such as a fluorine, a chlorine, a bromine, an iodine, an alkoxy, or a polyoxyalkyl group; each X is independently a hydrocarbon group containing 1 to 30 carbon atoms selected from an alkyl, alkenyl, aryl, alkaryl, aralkyl, alkylene, arylene, alkenylene, or combinations of two or more thereof; and each Z is independently a halogen, a carbonyl, a hydroxy, an epoxy, a polyoxyalkyl group, a sulfonic acid or a salt thereof, an amine, an isocyan, a mercaptan, or combinations thereof; m is 1 to 3; n is 1 to 3; and p is 1 to 20.

Z can be a reactive hydrophobic group or a hydrophilic group. The term "reactive hydrophobic group" as used herein refers to a hydrophobic group which can react with other compounds or functional groups such as an alcohol, water, an acid, a base, or a carbonyl compound. Example of reactive hydrophobic groups include, but are not limit to, a halogen, an ester, a ketone group, an aldehyde, a polyoxyalkyl group, or a mercaptan. As a halogen, it can be fluorine, chlorine, bromine, iodine, or their combinations. When Z is a reactive hydrophobic group, the organosilane $D_mSiX_nZ_p$ is not soluble in water or ethylene glycol unless it is partially reacted in the glycol-organosilane composition.

Examples of the organosilane compounds, where Z is a reactive hydrophobic group, include, but are not limited to, 3-acetoxypropyltrimethoxysilane, 3-acetoxypropyltriethoxysilane, 3-acetoxypropyltrichlorosilane, 3-methacryloxypropyltrimethoxysilane, 3-methacryloxypropyltriethoxysilane, 2-(carbomethoxy)ethyltrichlorosilane, 2-(carbomethoxy)ethyltrimethoxysilane, 3-chloropropyltrichlorosilane, 3-chloropropyltrimethoxysilane, 3-chloropropyltriethoxysilane, 3-chloropropylmethyldimethoxysilane, 3-chloropropylmethyldiethoxysilane, 3-mercaptopropyltrimethoxysilane, 3-mercaptopropyltriethoxysilane, chloromethyltrichlorosilane, chloromethyltrimethoxysilane, chloromethyltriethoxysilane, and combinations of two or more thereof.

When Z is a hydrophilic group, the organosilane $D_mSiX_nZ_p$ can be substantially soluble in water or glycol at ambient temperature or elevated temperature from 20 to 180 degree C. Examples of hydrophilic groups include, but are not limited to, a hydroxy, an epoxy, a sulfonic acid or a salt thereof, a carboxylic acid or a salt thereof, an amine, and an isocyan. Examples of the organosilane compounds, where Z is a hydrophilic group, include, but are not limited to, 3-aminopropyltrimethoxysilane, 3-aminopropyltriethoxysilane, methylaminopropyltrimethoxysilane, N-[3-trimethoxysilyl)propyl]ethylenediamine, aminoethylaminopropyltrimethoxysilane, aminoethylaminopropyltrimethoxysilane, 3-hydroxypropyltrimethoxysilane, 3-hydroxypropyltriethoxysilane, hydroxymethyltriethoxysilane, hydroxymethyltrimethoxysilane, 3-glycidoxypropyltrimethoxysilane, 3-glycidoxypropyltriethoxysilane, and combinations of two or more thereof.

The ratio of organosilane compound to glycol can be between 0.001:1 to 1:1, preferably between 0.01:1 to 0.3:1, and most preferably 0.05:1 to 0.2:1 by mole. The presently preferred glycol is a glycol of the formula $(HO)_nA(OH)_n$, in which A is an alkylene group, an arylene group, alkenylene group, a hydrocarbon oxygen group, or their combinations; and n is 1 to 3. Examples of suitable glycols include, but are not limited to, ethylene glycol, propylene glycol, isopropylene glycol, butylene glycol, 1-methyl propylene glycol, pentylene glycol, 1,3-propanediol, 1,3-butanediol, 1,4-butanediol, diethylene glycol, triethylene glycol, polyethylene glycol, polyalkylene glycol, alkoxylated glycol, 1,4-cyclohexanedimethanol, neopentyl glycol, or combinations of two or more thereof. The presently most preferred glycol is an alkylene glycol such as ethylene glycol, 1,3-propanediol, 1,4-butanediol, or combinations of two or more thereof.

Optionally, the glycol-organosilane composition can comprise a catalyst. The catalyst can be a mineral acid, a Lewis acid, or a base. The molar ratio of catalyst to organosilane compound can be between about 0.001:1 and about 2:1, preferably between about 0.01:1 and about 1:1. The catalysts can be heterogeneous, in the form of pellets or beads, depending on equipment design, or homogeneous, i.e., completely soluble in the reaction medium. Examples of acid catalysts include, but are not limited to, phosphoric acid or salts thereof, phosphorous acid or salts thereof, hydrochloric acid, sulfuric acid, p-toluene-sulfonic acid, and combinations of two or more thereof. Examples of basic catalysts include, but are not limited to, tertiary amines, alkali metal hydroxides and alkali earth metal hydroxides such as lithium hydroxide, sodium hydroxide, potassium hydroxide, calcium hydroxide, alkali metal alkoxides and alkali earth metal alkoxides such as lithium methylate, lithium ethylate, sodium methylate, sodium ethylate, sodium propoxide, potassium methylate, potassium ethylate, and combinations of two or more thereof. The acid or base catalyst disclosed above can also participate in the reaction as a reactant to react with the glycol or organosilane.

Optionally, the glycol organosilane composition can also comprise water in the range from about 0.1% to about 20% based on the weight of the composition.

The glycol-oragnosilane can be prepared by any method known to one skilled in the art in any suitable reaction vessels such as a mixing tank. In a preferred method, the organosilane, glycol, and optionally catalyst, can be combined, in any order, under a suitable condition effective for the production of the composition or a reaction product. Such a condition can include a temperature in the range of from about 0° C. to about 220° C., preferably about 80° C. to about 190° C., most preferably 120° C. to 160° C., under a pressure that can accommodate the temperature range, and for a period of time sufficient to produce the composition or the reaction product. If desired, the combination can be aided with a mixing such as a mechanical agitation. The glycol-organosilane composition for use with the invention can be produced on site where it is to be used. It can also be made in another location, optionally at a higher organosilane concentration, and transported to the site for use. The invention process can be a batch process that is simple and inexpensive to operate. It can also be carried out by any continuously methods known to one skilled in the art.

The glycol-organosilane composition obtained from a suitable reaction vessel can be used as produced without further purification. The composition can also be further purified by any means known to one skilled in the art if desired. The byproduct in the glycol-organosilane composition is preferably partially or completely removed by any suitable means known to one skilled in the art such as distillation or filtration. Examples of byproducts, which can present in the range of from about 1% to about 20% based on the weight of the composition, include, but are not limited to, methanol, ethanol, hydrogen halides such as hydrogen chloride and hydrogen bromide, halogen metal salts or halogen earth metal salts such as lithium chloride, sodium chloride, potassium chloride and ammonium chloride. For example, the solution of 3-acetoxypropyltrimethoxysilane in glycol can be heated between 40° C. and 200° C., preferably between 80° C. and 160° C., to partially or completely remove and condense byproduct methanol and acetic acid.

The glycol-organosilane composition can be dissolved in a solvent in any suitable manner and in any suitable container, vessel, or reactor at ambient temperature or elevated temperatures from 0° C. to 220° C. Examples of suitable solvents include, but are not limited to, water, alkyl alcohol, ethylene glycol, isopropylene glycol, butylene glycol, 1-methyl propylene glycol, pentylene glycol, diethylene glycol, triethylene glycol, polyethylene glycols, polyoxyethylene glycols, polyoxypropylene glycols, polyoxybutylene glycols, and combinations of two or more thereof. A preferred glycol is an alkylene glycol, such as ethylene glycol 1,3-propanediol, 1,4-butanediol, or combinations of two or more thereof.

The glycol-organosilane composition can be used in a variety of applications such as (a) as coupling agents; (b) as treatment of surfaces, including fillers and pigments; (c) as additives to coatings or paints; (d) as additives to adhesives; (e) as additives to organic monomers (such as acrylics, halogenated monomer, and polyester monomer) prior to formation of the respective polymers; (f) as a rubber-processing aid, to treat and couple the inorganic fillers in halogenated rubber such as chlorobutadiene rubber, chlorinated butyl rubber, chlorohydrined rubber, and chlorosulfonated polyethylene, so as to improve their physical-mechanical properties; and (g) as a temporary crosslinker for polyester described below.

The invention also provides a polyester copolymer composition. The composition comprising repeat units derived from (a) a carbonyl compound or oligomer thereof, (b) an alkylene glycol, (c) a crosslinker, and (d) optionally a comonomer.

The carbonyl compound can have the formula of HO—$R^1$—COOH or $R^1O_2CA^1CO_2R^1$ in which $A^1$ is an alkylene group, arylene group, alkenylene group, or combinations of two or more thereof having 2 to 30 carbon atoms per group; each $R^2$ is independently selected from (i) hydrogen, (ii) a hydrocarboxyl radical having a carboxylic acid group at the terminus, or (iii) a hydrocarbyl radical in which each radical has 1 to 30 carbon atoms per radical selected from an alkyl, alkenyl, aryl, alkaryl, aralkyl radical or combinations of two or more thereof.

The preferred carbonyl compound is an organic acid or ester thereof having the formula of $R^1COOR^1$ in which each $R^1$ is the same as that disclosed above. The more preferred organic acid is an organic acid having the formula of $HO_2CA^1CO_2H$ in which $A^1$ is the same as disclosed above. Each $A^1$ has about 2 to about 30, preferably about 4 to about 20, and most preferably 6 to 10 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthatate, methyl benzoate, dimethyl glutarate, and combinations of two or more thereof.

Examples of carboxylic acid metal salts or esters thereof includes a 5-sulfo isophthalate metal salt and its ester having the formula of $(R^2O_2C)_2ArS(O)_2OM$ in which each $R^2$ can be the same or different and is hydrogen or an alkyl group containing 1 to about 6, preferably 2, carbon atoms. Ar is a phenylene group. M can be an alkali metal ion such as sodium. An example of the ester is bis-glycolate ester of 5-sulfo-isophthalate sodium salt.

The oligomer generally can contain 2 to 100 repeat units.

The crosslinker can be a first crosslinker, a second crosslinker, or combinations thereof. The first crosslinker is a glycol-organosilane composition disclosed above. When the first crosslinker is used, diethylene glycol, triethylene glycol, polyethylene glycol, polyalkylene glycol, alkoxylated glycol can also be used in addition to the alkylene glycol to produce the polyester copolymer.

The second crosslinker can be a carbonyl compound containing 3 or more carboxyl groups, an alcohol containing 3 or more hydroxyl groups, or a compound having combinations of 3 or more carbonyl and hydroxyl groups. Examples of the second crosslinkers include, but are not limited to, trimellitic anhydride, 1,2,4-benzenetricarboxylic acid, ester of 1,2,4-benzenetricarboxylic acid, 1,3,5-benzenetricarboxylic acid, ester of 1,3,5-benzenetricarboxylic acid, pyromellitic dianhydride, trimethylolpropane, 1,1,1-tris(hydroxymethyl)ethane, pentaerythritol, tartaric acid, citric acid, gallic acid, pyrogallol, glycol mixture thereof, and combinations of two of more thereof. Preferably the crosslinker is a carbonyl compound containing 3 carboxyl groups, such as trimellitic acid or its anhydride or its glycol ester, trimesic acid or its glycol ester.

The preferred comonomer is a dicarboxylic compound other than terephthalic acid or its ester or its oligomer, a diol compound other than said alkylene glycol; or a carbonyl alcohol containing one carboxyl group and one hydroxyl group.

Illustrative examples of the comonomers include, but are not limited to, isophthalic acid, napthalic acid, phthalic acid, cyclohexane dicarboxylic acid, 1,2-cyclohexanedicarboxylic anhydride, naphthalenedicarboxylic acid, oxalic acid, malonic acid, succinic acid, glutaric acid, adipic acid, sebacic acid, maleic acid, fumaric acid, maleic anhydride, dimethyl adipate, dimethyl phthalate, dimethyl isophthalate, dimethyl glutarate, dimethyl cyclohexane dicarboxylate, dimethyl naphthalenedicarboxylate, diethylene glycol, triethylene glycol, polyethylene glycol, polypropylene glycol, polyoxyethylene glycol, polyoxypropylene glycol, polyoxybutylene glycol, 1,4-cyclohexanedimethanol, neopentyl glycol, lactic acid, 2-hydroxybenzoic acid, 4-hydroxybenzoic acid, mandelic acid, glycol mixture thereof, and combinations of two or more thereof.

The polyester copolymer can contain, by weight, repeat units derived from the comonomer about 0.1% to about 50%; the crosslinker about 50 ppm (parts per million) to about 5,000 ppm, preferably 200 to 2,000 ppm. The rest of the repeat units are derived from the carbonyl compound and the alkylene glycol. Low level of crosslinks or branches is preferred. If the concentration of crosslinker is too high (i.e., more then 5,000 ppm of polymer weight), excessive crosslink may form, which adversely affect polyester properties.

The first crosslinker is also referred to as temporary crosslinker while the second crosslinker is also referred to as permanent crosslinker. A polyester polymer comprising repeat unit derived, or is produced from, the first crosslinker is generally referred to as a temporarily crosslinked polyester copolymer while that produced from the second crosslinker is referred to as permanently crosslinked polyester copolymer.

I have unexpectedly found that the permanently crosslinked polyester copolymer containing a comonomer described above can simultaneously increase the rate of polymerization, reduce the rate of crystallization, and increase the melt strength during an object forming process such as spinning of fibers and injection, extrusion or stretching of containers and packaging materials. I also found that permanently crosslinked polyester copolymer containing a comonomer described above can simultaneously increase the rate of polymerization, improve the dyeability and melt strength therefore spinning performance of fibers.

For applications such as containers and packaging materials, a permanently crosslinked polyester copolymer can increase the rate of polymerization, reduce the rate of crystallization, increase the melt strength during object forming process such as stretching, injection, extrusion and blow molding, and improve the heat resistance and clarity of the finished products. The comonomer can be about 0.1% to about 10%, preferably about 0.3% to about 3%, based on polymer weight.

For applications such as atmospherically dyeable fibers, a permanently crosslinked polyester copolymer can increase the rate of polymerization, increase the melt strength, improve spinning and dyeability; the comonomer can be about 1% to about 20%, preferably about 3% to about 10%, based on polymer weight. For applications such as binder fibers and biodegradable fibers, a permanently crosslinked polyester polymer can increase the rate of polymerization, increase the melt strength and improve spinning; the comonomer can be about 5% to about 50%, preferably about 15% to about 40%, based on polymer weight.

The polyester copolymer can also comprise or consist essentially of repeat units derived from a carbonyl compound, a glycol, and a glycol-organosilane as a first crosslinker. The organosilane $D_m SiX_n Z_p$ of the glycol-organosilane composition can be in the range from about 0.02% to about 3%, preferably about 0.06% to about 1%, most preferably from about 0.1% to about 0.5%, based on the weight of the polyester copolymer. This temporary crosslinker can simultaneously increase the rate of polymerization and increase the pill resistance of a polyester copolymer.

The present invention also provides a process for higher speed spinning to increase assets productivity. The normal spinning speed for partially oriented yarn (POY) is about 3000 to 3500 meter/min. Spinning speed is limited by the rate of crystallization during spinning. Temporary crosslinker glycol-organosilane reduces the crystallization rate therefore spinning speed can be increased to 3500–5000 m/min. The organosilane $D_m SiX_n Z_p$ can be in the range from about 0.01% to about 1%, preferably about 0.03% to 0.3%, based on the weight of the polyester copolymer.

In case high speed spinning of 3500–5000 m/min is not desired, temporary crosslinker glycol-organosilane can reduce the crystallinity of POY. Normal draw texturing speed of POY is limited to about 900 m/min. When the crystallinity of POY decreases at normal speed 3000–3500 m/min due to the temporary crosslinker, draw texturing speed can be increase to about 1000 m/min.

The glycol-organosilane composition disclosed above forms temporary crosslinks or branches in the polyester, which hydrolyze after spinning in the presence of moisture, water, an alcohol, a weak acid, or a weak base. It does not form rocks or sands in the TPA polymerization process where there is water byproduct. After spinning and draw texturing, the temporary crosslinks or branches break down by hydrolysis with water in process such as wet drawing and dye bath or moisture from the air. After hydrolysis, the fibers products are the same as those of linear polymer.

Preferably, the glycol-organosilane does not form any permanent crosslink or branch which affects spinning performance. Because the glycol-organosilane composition is partially reacted, there are means to remove byproduct such as methanol before adding to polymerization process, byproduct level in polymerization can be decreased.

The polyester polymers disclosed above can be produced by any methods known to one skilled in the art. A preferred process for producing the polymers comprises contacting a polymerization mixture with a crosslinker and, for producing a permanently crosslinked polyester copolymer, a comonomer disclosed above. The polymerization mixture can consist essentially of a glycol and a carbonyl compound disclosed above. The weight or mole of each compound required is the weight or mole that can produce a desired copolyester disclosed above. For example, the molar ratio of the glycol to carbonyl compound can be any ratio so long as the ratio can effect the production of polyester disclosed above. Generally the ratio can be in the range of from about 1:1 to about 10:1, preferably about 1:1 to about 4:1.

Any suitable condition to effect the production of a polyester can include a temperature in the range of from about 200° C. to about 400° C., and preferably 250° C. to 300° C. under a pressure in the range of from about 0.001 to about 1 atmosphere (0.1 to 101.3 kPa) for a time period of from about 0.3 to about 20 hours, preferably about 1 to about 10 hours.

Also for example, the glycol-organosilane composition (or comonomer, second crosslinker, or both) can be added together or separately to the polymerization process before, during, or after transesterification of the carbonyl compound; before, during, or after esterification of the carbonyl compound. Similarly, the glycol-organosilane (or comonomer, second crosslinker, or both) can be added before, during, or after polycondensation of the carbonyl component or an oligomer of the carbonyl compound.

Optionally, a sulfonated isophthalate metal salt such as dimethyl sodium sulfoisophthalate and bis(2-hydroxyethy) lithium 5-sulfoisophthalate or their glycol solution can be added to the polymerization mixture. The sulfonated isophthalate metal salt and crosslinker or comonomer can be added together or separately.

I have unexpected found the polyester copolymer comprising a sulfonated isophthalate metal salt, a carbonyl compound, a glycol, a temporary crosslinker, and a comonomer is substantially soluble in water. The polyester copolymer composition comprising a sulfonated isophthalate metal salt, a carbonyl compound, a glycol, with or without a comonomer, and a temporary crosslinker can be dyed by cationic dyes, or can have better dyeability by disperse dye. The sulfonated isophthalate metal salt, carbonyl compound, glycol, temporary crosslinker, and comonomer are the same as those described above.

The comonomer and the crosslinker can be simply mixed, substantially dissolved, or reacted with a solvent A comonomer and a crosslinker containing one or more hydroxyl groups can be substantially dissolved in a solvent. The solvent can be an alcohol or water, preferably an alkylene glycol which is a component of the polymerization mixture.

A comonomer and a crosslinker containing one or more carboxyl groups can partially react or completely react with a glycol described above, preferably partially reacted. The preferred partially reacted comonomer-glycol solution or crosslinker-glycol solution can be prepared at the conditions similar to those described above to produce partially reacted glycol-organosilane composition. Optionally a catalyst such as a titanium catalyst can be added to the mixture.

When a comonomer or crosslinker containing one or more carboxyl groups partially react with the alkylene glycol and substantially dissolve in the glycol, presently preferred solution is that about 20% to about 99%, preferably about 50% to about 95%, and most preferably 60% to 90%, of the carboxyl groups of the comonomer or crosslinker are reacted with the glycol. The reaction product can be used as produced without farther purification. The composition can also be further purified by any means known to one skilled in the art if desired. For example, a solution of isophthalic acid in glycol or a solution of trimellitic anhydride in glycol can be heated between 40° C. and 220° C., preferably between 100° C. and 190° C., to partially or completely remove and condense byproduct water.

Optionally, other ingredients of the polymer such as catalyst, toner, optical brightener, $TiO_2$, or phosphorous can be mixed with the comonomer-glycol solution or crosslinker-glycol solution before they are added to the polymerization mixture.

Any solvent that can substantially dissolve the comonomer-glycol solution or crosslinker-glycol solution discussed above can be used to dissolve the comonomer-glycol solution or crosslinker-glycol composition. The presently preferred solvent is alkylene glycol such as ethylene glycol, 1,3-propanediol, or 1,4-butanediol.

The invention process can also be carried out in the present of a catalyst and optionally a phosphorous compound. The catalyst, expressed as element Co, Sb, Mn, Zn, Si, Ge, or Ti, can be present in the range of about 1 to about 5,000 ppm of the medium comprising the carbonyl compound and glycol, preferably about 10 to about 500 ppm, most preferably 30 to 300 ppm, by weight. A presently preferred polycondensation catalyst is antimony. Examples of suitable antimony compounds include, but are not limited to, antimony oxides, antimony acetate, antimony glycolates, antimony phosphates, and combinations of two or more thereof.

Any phosphorus compound that, when used with a polyester catalyst, produces polyester having low yellowness, as compared to a polyester produced from a catalyst without such phosphorus compound, can be used. Examples of suitable phosphorus compounds include, but are not limited to, a phosphoric acid or salt thereof, a polyphosphoric acid or a salt thereof, a phosphonate ester, a pyrophosphoric acid or salt thereof, a pyrophosphorous acid or salt thereof, di(polyoxyethylene)hydroxymethyl phosphonate, triethyl phosphonoacetate, and combinations of two or more thereof. The salt can be an alkali metal salt or an alkaline earth metal salt.

Optionally, $TiO_2$ or $TiO_2$ slurry can be added to the polymerization mixture. The polyester produced by the invention process can contain $TiO_2$ about 0.01% to about 5%, preferably about 0.03% to about 2.0%, based on polymer weight The invention process can also be carried out using conventional melt or solid state techniques and in the presence or absence of a toner compound to reduce the color of a polyester produced. Examples of toner compounds include, but are not limited to, cobalt aluminate, cobalt acetate, carbazole violet. These toner compounds are well known to those skilled in the art. The toner compound can be used with the catalyst disclosed herein in the amount of about 0.1 ppm to 1000 ppm, preferably about 1 ppm to about 100 ppm, based on the weight of polyester polymer produced.

The process of the invention can also be carried out using a conventional melt or solid state technique and in the presence or absence of an optical brightening compound to reduce the yellowness of the polyester produced. Examples of optical brightening compounds include, but are not limited to, 7-naphthotriazinyl-3-phenylcoumarin and 4,4'-bis(2-benzoxazolyl)stilbene. These optical brightening compounds are well known to those skilled in the art. The optical brightening compound can be used in the amount of about 0.1 ppm to 1,000 ppm, preferably about 1 ppm to about 100 ppm, based on the weight of polyester polymer produced.

EXAMPLES

The following examples are included to further illustrate the invention and are not to be constructed as to unduly limit the scope of the invention.

Polymer molecular weight is determined by intrinsic viscosity (IV). The IV is expressed as hydrolyzed IV and unhydrolyzed IV. Unhydrolyzed IV measures the molecular weight of the polyester containing temporary crosslinks.

Hydrolyzed IV measures the molecular weight of the polyester after its temporary crosslinks breaks down by hydrolysis. Hydrolyzed IV is measured by the ratio of the viscosity of a solution of 0.8 grams of polymer dissolved at room temperature in 10 ml of hexafluoroisopropanol (HFIP) containing 100 ppm sulfuric acid to the viscosity of the sulfuric acid containing HFIP itself, both measured at 25° C. in a capillary viscometer. Unhydrolyzed IV analysis is similar to that of hydrolyzed IV without the sulfuric acid in HFIP.

Example 1

This example compares the water mixtures of organosilane compounds containing hydrophilic groups and those containing hydrophobic groups. The epoxy group of 3-glycidoxypropyltrimethoxysilane (GTMS) and the amino group of 3-aminopropyltrimethoxysilane (ATMS) are hydrophilic, GTMS and ATMS are soluble in water. The ester group of 3-acetoxypropyltrimethoxysilane (APMS) and the chlorine of 3-chloropropyltrimethoxysilane (CPMS) are hydrophobic, APMS and CPMS are not be soluble in water.

GTMS (10 g) and ATMS (10 g), both from Aldrich Chemical Company, Milwaukee, Wis., USA, are separately added to water (50 g) in two separate open glass beakers. Each mixture is agitated and heated to 60° C. and hold for 10 minutes. After cooling to room temperature (about 25° C.), each mixture is a clear one-phase solution.

Similarly, APMS (10 g; from Gelest Inc., Momsville, Pa., USA) and CPMS (10 g; from Aldrich Chemical Company) are separately added to water (50 g) in two separate open glass beakers. Each mixture is agitated and heated to 60° C. and hold for 10 minutes. After cooling to room temperature, each organosilane is in the bottom while water is on top of the beakers.

Example 2

This example compares the glycol mixtures of organosilane compounds containing hydrophilic groups and those containing hydrophobic groups.

GTMS (10 g) and ATMS (10 g) are separately added to ethylene glycol (50 g) in two separate open glass beakers. Each mixture is agitated and heated to 60° C. and hold for 10 minutes. After cooling to room temperature, each mixture is a clear one-phase solution.

Similarly, APMS (10 g) and CPMS (10 g) are separately added to ethylene glycol (50 g) in two separate open glass beakers. Each mixture is agitated and heated to 60° C. and hold for 10 minutes. After cooling to room temperature, glycol is in the bottom and the organosilane on top.

Example 3

This example compares tetraethoxysilane (TEOS), n-propyltriethoxysilane (PES), and 3-Acetoxypropyltrimethoxysilane (APMS). TEOS molecule has four hydrolysable Si—O—C bonds, but no Si—C bonds. PES molecule has three hydrolysable Si—O—C bonds and one non-hydrolysable Si—C bond of the propyl group. APMS molecule also has three hydrolysable Si—O—C bonds and one non-hydrolysable Si—C bond of the propyl group. In addition, APMS molecule has an ester group bonded to the propyl group. The partially reacted compositions of TEOS in ethylene glycol and partially reacted PES in ethylene glycol form solid when they are mixed with water. The partially reacted composition of APMS in ethylene glycol is miscible with water, no solid is formed.

Sodium hydroxide (0.04 g) and each of TEOS (from Silbond Corporation, Weston, Mich., USA; 20 g), PES (from Gelest Inc., Morrisville, Pa.; 20 g), and APMS (20 g) is added to 80 g of ethylene glycol in a 250 ml open flask at room temperature. Each mixture is agitated and heated at 150° C. for 1 hour under a hood. TEOS, PES, and APMS are partially reacted with ethylene glycol, reaction byproduct ethanol is partially evaporated. Each mixture becomes a clear one-phase solution, which stays as a uniform clear solution after cooling to room temperature. To test its miscibility with water, three solutions are prepared from each mixture: (1) 5 g of the clear organosilane solution is added to 45 g of water in a 100 ml open beaker; (2) 20 g of the clear organosilane solution is added to 20 g of water in a 100 ml open beaker; (3) 45 g of the clear organosilane solution is added to 5 g of water in a 100 ml open beaker. All aqueous solutions become clear after stirring. After 8 hours without agitation, solids form in the bottom of six beakers of TEOS and PES aqueous solutions, but not in the three beakers of APMS aqueous solutions.

Example 4

This example shows that a glycol organosilane composition is not soluble in water when the extent of reaction of organosilane with glycol is low.

The procedure disclosed in EXAMPLE 3 is repeated with APMS and CPES (3-Chloropropyltriethoxysilane; Aldrich Chemical) except that sodium hydroxide is not present, and the heating time at 150° C. is 5 minutes instead of 1 hour. Each of the resulting glycol solutions becomes clear after cooling to room temperature. Each of the glycol solution mixed with water is clear after stirring. However, after 8 hours without agitation, each organosilane compound precipitates to the bottom of the beaker with water and glycol solution on top.

Example 5

This example illustrates polymerization of polyester containing temporary crosslinks from a TPA oligomer in a kettle polymerization apparatus.

An oligomer of polyethylene terephthalate with a degree of polymerization between 5 and 10 is obtained from a continuous esterification process. Terephthalic acid is esterified by ethylene glycol to form the oligomer in an esterifier. The polyester esterification and polycondensation process are well known to one skilled in the art, only a brief description is provided herein.

A pot is preheated to 265° C. A 500 ml resin kettle is provided with an agitator, a thermocouple, condenser and nitrogen sweep. To this kettle it is added 105 g of ethylene glycol, 400 g of oligomer, 8 g of APMS in glycol composition prepared in EXAMPLE 3, 6 g of $TiO_2$ 20% slurry in ethylene glycol and 4 g of antimony glycolate solution (containing 1% Sb by weight). The temperature is increased to 265° C. and held there until oligomer is liquefied, the agitator is turned on at 60 rpm. Temperature is raised to 275° C. and vacuum reduced to 120 mm Hg and held for 20 minutes. The temperature is then increased to 280° C. and vacuum reduced to 30 mm Hg and hold for 20 minutes. Thereafter, the vacuum is reduced to 1 mm Hg while temperature is held at 280° C. When the torque reaches 3 kg, agitator speed is reduced to 40 rpm. Polymerization stops when the torque reaches 3 kg again. The polymer melt is poured into aluminum pots, and the resultant solid is dried in vacuum oven without heat for 1 hour and ground to pass through a 2 mm filter. The grounded polymer has good color and is analyzed for molecular weight. The non-hydrolyzed IV is about 0.55 ml/g at this torque, the hydrolyzed IV about 0.39 ml/g.

CPES in ethylene glycol composition is prepared similarly to the APMS in ethylene glycol composition in EXAMPLE 3. The recipe and polymerization procedures are similar to that disclosed above, except that 4 g of CPES in glycol composition is added in place of 4 g of APMS in glycol composition. The grounded polymer has good color and is analyzed for molecular weight. The non-hydrolyzed IV is about 0.55 ml/g at this torque, the hydrolyzed IV about 0.40 ml/g.

Example 6

This example illustrates polymerization of polyester containing permanent crosslinks from a TPA oligomer in a kettle polymerization apparatus.

Ethylene glycol (EG; 78 g), isophthalic acid (IPA; 20 g) and trimellitic anhydride (TMA; 2 g; from Aldrich Chemical Company) are added to a 250 ml flask at room temperature. The mixture is agitated with a magnetic stirrer and heated under a hood. The mixture is heated to about 180° C. and hold for 2 hours. IPA and TMA are partially reacted with ethylene glycol, reaction byproduct water partially evaporated. After heating, the mixture becomes a clear one-phase solution.

A 500-ml resin kettle is set up the same as that in EXAMPLE 5. To this kettle it is added 88 g of ethylene glycol, 400 g of oligomer described in EXAMPLE 5, 20 g of IPA and TMA in ethylene glycol solution prepared in the above, 10 g of antimony glycolate in ethylene glycol solution (containing 1% Sb by weight), 2 g of cobalt acetate tetrahydrate in ethylene glycol solution (containing 1% Co by weight), 4 g of phosphoric acid in ethylene glycol solution (containing 1% $H_3PO_4$ by weight). The polymerization is carried out the same as disclosed in EXAMPLE 5. Polymerization stops when the torque reaches 5 kg. The polymer melt is poured into a water bath to solidify the melt, and the resultant solid is crystallized at 90° C. in a vacuum oven for 1 hour and ground to pass through a 2 mm filter. The grounded polymer is dried in the oven at 90° C. for another hour. The polymer have good color and can be analyzed for molecular weight, intrinsic viscosity is about 0.7 ml/g at this torque.

I claim:

1. A composition comprising repeat units derived from (a) a carbonyl compound or oligomer thereof, (b) a glycol, and (c) a crosslinker wherein said carbonyl compound is HO—$R^1$—COOH or $R^1O_2CACO_2R^1$;

A is an alkylene group, arylene group, alkenylene group, or combinations of two or more thereof having 2 to 30 carbon atoms per group;

each $R^1$ is independently selected from (i) hydrogen, (ii) a hydrocarboxyl radical having a carboxylic acid group at the terminus, or (iii) a hydrocarbyl radical in which each radical has 1 to 30 carbon atoms per radical selected from an alkyl, alkenyl, aryl, alkaryl, aralkyl radical, or combinations of two or more thereof;

said oligomer has 2 to 100 repeat units;

said crosslinker is a glycol-organosilane, which comprises or is produced by combining (a) a glycol and (b) an organosilane comprising $D_mSiX_nZ_p$;

D is a halogen, a hydrogen, or a hydrocarbon oxygen group;

X is a hydrocarbon or a hydrocarbon oxygen group;

Z is a reactive hydrophobic group;

each of m and n is 1 to 3; and p is 1 to 20.

2. A composition according to claim 1 wherein

D is halogen, an alkoxy, or a polyoxyalkyl group;

X is a hydrocarbon group containing 1 to 30 carbon atoms selected from an alkyl, alkenyl, aryl, alkaryl, aralkyl, alkylene, arylene, alkenylene, or combinations of two or more thereof; and Z is a halogen, an ester, an aldehyde, a ketone, or a mercaptan.

3. A composition according to claim 2 wherein said organosilane is 3-acetoxypropyltrimethoxysilane, 3-acetoxypropyltriethoxysilane, 3-acetoxypropyltrichlorosilane, 3-methacryloxypropyltrimethoxysilane, 3-methacryloxypropyltriethoxysilane, 2-(carbomethoxy)ethyltrichlorosilane, 2-(carbomethoxy)ethyltrimethoxysilane, 3-chloropropyltrichlorosilane, 3-chloropropyltrimethoxysilane, 3-chloropropyltriethoxysilane, 3-mercaptopropyltrimethoxysilane, chloromethyltrimethoxysilane, chloromethyltriethoxysilane, or combinations of two or more thereof.

4. A composition according to claim 2 wherein said glycol is ethylene glycol, propylene glycol, isopropylene glycol, butylene glycol, 1-methyl propylene glycol, pentylene glycol, 1,3-propanediol, 1,3-butanediol, 1,4-butanediol, diethylene glycol, triethylene glycol, polyethylene glycol, polyalkylene glycol, alkoxylated glycol, 1,4-cyclohexenedimethanol, neopentyl glycol, or combinations of two or more thereof.

5. A composition according to claim 4 wherein said crosslinker further comprises an acid or a base and the molar ratio of said acid or said base to said organosilane is between about 0.01:1 to about 1:1.

6. A composition according to claim 5 wherein said organosilane having its reactive functional groups reacted with said acid or said base.

7. A composition according to claim 4 wherein said organosilane having about 20% to about 99% of its reactive functional groups with said glycol.

8. A composition according to claim 3 wherein said organosilane having about 50% to about 95% of its reactive functional groups reacted with said glycol.

9. A composition comprising a partially reacted glycol-organosilane, which comprises, or is produced by combining, (a) a glycol and (b) an organosilane comprising $D_mSiX_nZ_p$ wherein D is a halogen, a hydrogen, or a hydrocarbon oxygen group;

X is a hydrocarbon or a hydrocarbon oxygen group;

Z is a reactive hydrophobic group or a hydrophilic group;

each of m and n is 1 to 3; and p is 1 to 20.

10. A composition according to claim 9 wherein

D is halogen, an alkoxy, or a polyoxyalkyl group;

X is a hydrocarbon group containing 1 to 30 carbon atoms selected from an alkyl, alkenyl, aryl, alkaryl, aralkyl, alkylene, arylene, alkenylene, or combinations of two or more thereof; and Z is a halogen, a carbonyl, a mercaptan, a hydroxy, an epoxy, a polyoxyalkyl group, a sulfonic acid or a salt thereof, a carboxylic acid or a salt thereof, an amine, or an isocyan.

11. A composition according to claim 10 wherein said organosilane is 3-acetoxypropyltrimethoxysilane, 3-acetoxypropyltriethoxysilane, 3-acetoxypropyltrichlorosilane, 3-methacryloxypropyltrimethoxysilane, 3-methacryloxypropyltriethoxysilane, 2-(carbomethoxy) ethyltrichlorosilane, 2-(carbomethoxy) ethyltrimethoxysilane, 3-chloropropyltrichlorosilane, 3-chloropropyltrimethoxysilane, 3-chloropropyltrimethoxysilane, 3-chloropropylmethyldimethoxysilane, 3-chloropropylmethyldiethoxysilane, chloromethyltrimethoxysilane, chloromethyltriethoxysilane, 3-aminopropyltrimethoxysilane, 3-aminopropyltriethoxysilane, methylaminopropyltrimethoxysilane, 3-hydroxypropyltrimethoxysilane, 3-hydroxypropyltriethoxysilane, hydroxymethyltrimethoxysilane, hydroxymethyltriethoxysilane, 3-glycidoxypropyltrimethoxysilane, 3-glycidoxypropyltriethoxysilane, or combinations of two or more thereof.

12. A composition according to claim 11 wherein said organosilane is 3-acetoxypropyltrimethoxysilane, 3-acetoxypropyltriethoxysilane, 3-acetoxypropyltrichlorosilane, 3-methacryloxypropyltrimethoxysilane, 3-methacryloxypropyltriethoxysilane, 2-(carbomethoxy) ethyltrichlorosilane, 2-(carbomethoxy) ethyltrimethoxysilane, 3-chloropropyltrichlorosilane, 3-chloropropyltrimethoxysilane, 3-chloropropyltriethoxysilane, 3-mercaptopropyltrimethoxysilane, chloromethyltrimethoxysilane, chloromethyltriethoxysilane, or combinations of two or more thereof.

13. A composition according to claim 10 wherein said glycol is ethylene glycol, propylene glycol, isopropylene glycol, butylene glycol, 1-methyl propylene glycol, pentylene glycol, 1,3-propanediol, 1,3-butanediol, 1,4-butanediol, diethylene glycol, triethylene glycol, polyethylene glycol, polyalkylene glycol, alkoxylated glycol, 1,4-cyclohexanedimethanol, neopentyl glycol, or combinations of two or more thereof.

14. A composition according to claim 13 further comprising an acid or a base wherein the molar ratio of said acid or said base to said organosilane is between about 0.01:1 to about 1:1.

15. A composition according to claim 14 wherein said organosilane having its reactive functional groups reacted with said acid or said base.

16. A composition according to claim 14 wherein the molar ratio of said organosilane to said glycol is about 0.01:1 to about 0.3:1.

17. A composition according to claim 10 in said organosilane having all of its reactive functional groups reacted with said glycol.

18. A composition according to claim 13 wherein said organosilane having 50% to 95% of its reactive functional groups reacted with said glycol.

19. A composition according to claim 16 wherein said organosilane having 60% to 90% of its reactive functional groups reacted with said glycol.

20. A composition according to claim 10 wherein said glycol-organosilane further comprises water.

21. A composition according to claim 19 further comprising a byproduct, present in said composition in the range of from about 1% to about 20% % based on the weight of said composition, said byproduct is methanol, ethanol, a halide, or combinations thereof.

22. A composition according to claim 21 wherein said glycol-organosilane is dissolved in a solvent selected from the group consisting of an alcohol, water, and combinations of two or more thereof.

23. A process for producing a polyester comprising contacting a polymerization mixture with a crosslinker and optionally a comonomer wherein
said process is carried out under a condition effective to increases the pill resistance or strength of said polyester, to decrease the crystallization rate of said polyester, or to increase the rate of polymerization of said polyester;
said polymerization mixture comprises (a) a carbonyl compound and (b) an alkylene glycol;
said carbonyl compound is terephthalic acid, a terephthalic acid ester, an oligomer comprising repeat unit derived from terephthalic acid or a terephthalic acid ester, or combinations of two or more thereof;
said oligomer has 2 to 100 repeat units;
said crosslinker is a first crosslinker, a second crosslinker, or combinations thereof;
said first crosslinker is a glycol-organosilane, which comprises or is produced by combining (a) a glycol and (b) an organosilane comprising $D_mSiX_nZ_p$;
D is a halogen, a hydrogen, or a hydrocarbon oxygen group;
X is a hydrocarbon or a hydrocarbon oxygen group;
Z is a reactive hydrophobic group;
each of m and n is 1 to 3;
p is 1 to 20;
said comonomer is a dicarboxylic compound other than said carbonyl compound, a diol compound other than said alkylene glycol, or a carbonyl alcohol containing one carboxyl group and one hydroxyl group; and
said second crosslinker is a carbonyl compound containing 3 or more carboxyl groups, an alcohol containing 3 or more hydroxyl groups, or combinations of 3 or more carbonyl and hydroxyl groups.

24. A process according to claim 23 wherein
said crosslinker is said first crosslinker;
D is halogen, an alkoxy, or a polyoxyalkyl group;
X is a hydrocarbon group containing 1 to 30 carbon atoms selected from an alkyl, alkenyl, aryl, alkaryl, aralkyl, alkylene, arylene, alkenylene, or combinations of two or more thereof; and
Z is a halogen, an ester, an aldehyde, a ketone, or a mercaptan.

25. A composition according to claim 24 wherein said organosilane is 3-acetoxypropyltrimethoxysilane, 3-acetoxypropyltriethoxysilane, 3-acetoxypropyltrichlorosilane, 3-methacryloxypropyltrimethoxysilane, 3-methacryloxypropyltriethoxysilane, 2-(carbomethoxy) ethyltrichlorosilane, 3-chloropropyltrichlorosilane, 3-chloropropyltrimethoxysilane, 3-chloropropyltriethoxysilane, chloromethyltrimethoxysilane, chloromethyltriethoxysilane, or combinations of two or more thereof.

26. A process according to claim 24 wherein said alkylene glycol is ethylene glycol, propylene glycol, isopropylene glycol, butylene glycol, 1-methyl propylene glycol, pentylene glycol, 1,3-propanediol, 1,3-butanediol, 1,4-butanediol, 1,4-cyclohexanedimethanol, neopentyl glycol, or combinations of two or more thereof.

27. A process according to claim 24 wherein said first crosslinker further comprises an acid or a base wherein the molar ratio of said acid or said base to said organosilane is between about 0.01:1 to about 1:1.

28. A process according to claim 23 wherein said crosslinker is said second crosslinker;

said alkylene glycol is selected from the group consisting of ethylene glycol, 1,3-propanediol, 1,4-butanediol, and combinations of two or more thereof;

said composition comprises repeat unit derived from about 0.1% to about 50% of said comonomer based on the weight of said composition;

said comonomer is selected from the group consisting of isophthalic acid, napthalic acid, phthalic acid, cyclohexane dicarboxylic acid, 1,2-cyclohexanedicarboxylic anhydride, naphthalenedicarboxylic acid, oxalic acid, malonic acid, succinic acid, glutaric acid, adipic acid, sebacic acid, maleic acid, fumaric acid, maleic anhydride, dimethyl adipate, dimetyl phthalate, dimethyl isophthalate, dimethyl glutarate, dimethyl cyclohexane dicarboxylate, dimethyl naphthalenedicarboxylate, diethylene glycol, triethylene glycol, polyethylene glycol, polypropylene glycol, polyoxyethylene glycol, polyoxypropylene glycol, polyoxybutylene glycol, 1,4-cyclohexanedimethanol, neopentyl glycol, lactic acid, 2-hydroxybenzoic acid, 4-hydroxybenzoic acid, mandelic acid, glycol mixture thereof, and combinations of two or more thereof; and said composition comprises repeat unit derived from 100 parts per million by weight of said composition (ppm) to 5000 ppm of said crosslinker; and said crosslinker is trimellitic anhydride, 1,2,4-benzenetricarboxylic acid, ester of 1,2,4-benzenetricarboxylic acid, 1,3,5-benzenetricarboxylic acid, ester of 1,3,5-benzenetricarboxylic acid, pyromellitic dianhydride, trimethylolpropane, 1,1,1-tris(hydroxymethyl)ethane, pentaerythritol, tartaric acid, citric acid, gallic acid, pyrogallol, glycol mixture thereof, or combinations of two or more thereof.

29. A process according to claim 28 wherein said crosslinker is trimellitic anhydride, 1,2,4-benzenetricarboxylic acid or thereof, ester of 1,2,4-benzenetricarboxylic acid, 1,3,5-benzenetricarboxylic acid, ester of 1,3,5-benzenetricarboxylic acid, or combinations of two or more thereof.

30. A process according to claim 29 wherein said crosslinker having its reactive functional groups partially reacted with said glycol.

31. A process according to claim 23 further comprising contacting said polymerization mixture with a sulfonated isophthalate metal salt.

32. A process according to claim 27 for increasing the pill resistance of a polyester fiber.

33. A process according to claim 27 for decreasing the rate of crystallization during a spinning of a polyester fiber.

34. A process according to claim 28 for increasing the strength of an atmospherically dyeable polyester fiber, wherein said comonomer is about 1% to about 20%, based on the weight of said polyester.

35. A process according to claim 28 for increasing the strength of a biodegradable polyester fiber or of a polyester binder fiber, wherein said comonomer is about 5% to about 50%, based on the weight of said polyester.

36. A process according to claim 29 for increasing the strength or for decreasing the rate of crystallization of a polyester during an object forming, wherein said comonomer is about 0.1% to about 10%, based on the weight of said polyester.

37. A process according to claim 31 for increasing the water solubility of a polyester copolymer.

* * * * *